Dec. 12, 1972 R. D. WILMOT ET AL 3,705,936

MOVING TARGET PLATFORM DIGITAL VIDEO MAPPER

Filed May 18, 1970 4 Sheets-Sheet 1

INVENTORS
RICHARD D. WILMOT,
JACK R. BALLANTYNE,
BY Robert W. Hines
ATTORNEY

| BITS | 1 | 2 | 3 | 4 | 5 | 6 | 7 | 8 | 9 | 10 | 11 | 12 |
|---|---|---|---|---|---|---|---|---|---|---|---|---|
| | QUAD I CODES | | QUAD II CODES | | QUAD III CODES | | QUAD IV CODES | | ΔS | | UPDATE A | UPDATE B |
FIG. 3.
FIG. 4.
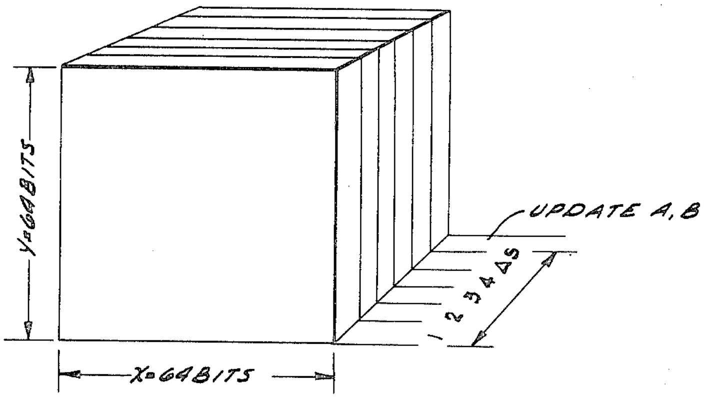
FIG. 5.
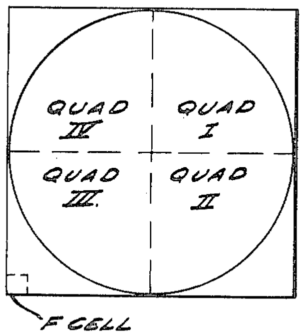
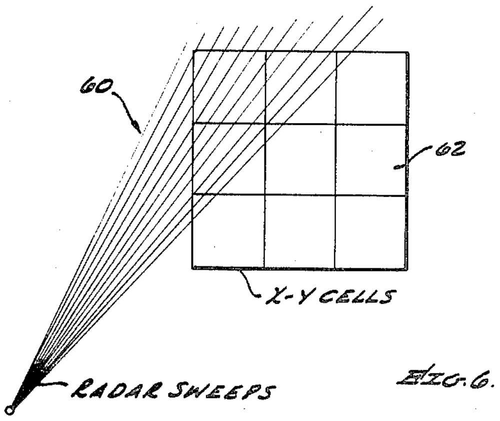
FIG. 6.

MOVING TARGET PLATFORM DIGITAL VIDEO MAPPER

Filed May 18, 1970 4 Sheets-Sheet 4

3,705,936

MOVING TARGET PLATFORM DIGITAL VIDEO MAPPER

Richard D. Wilmot, Brea, and Jack R. Ballantyne, Santa Ana, Calif., assignors to Hughes Aircraft Company, Culver City, Calif.

Filed May 18, 1970, Ser. No. 38,463
Int. Cl. G01s 9/42
U.S. Cl. 343—7.7 6 Claims

ABSTRACT OF THE DISCLOSURE

The apparatus of the present invention provides a digital video mapper for use on a moving radar platform. Contemporary video mappers will not function properly if the radar platform is moving, because under these circumstances a stationary return will, in general, have a different range and bearing measurement at every scan. With the range and azimuth of stationary targets changing as the radar platform moves, it is no longer possible to address the memory with the radar's range and azimuth counters, since a stationary return will not normally fall into the same memory cell when the memory is synchronized to the radar in this manner. In accordance with the present invention, a digital video mapper is provided wherein the digital mapper memory is automatically controlled with respect to a fixed reference, rather than to the moving radar. In addition, account is taken of new areas which continually enter the radar's coverage while other areas are being left behind.

BACKGROUND OF THE INVENTION

Contemporary digital video mappers stored a history of stationary video returns in a digital memory which mapped the radar's surveillance area into small cells of a size of the order of 2.8° by 4 miles. Each of these cells contained memory bits organized as a counter. When a target was detected, the counter in the cell containing the target was incremented; stationary targets, such as clutter returns, would cause the counter to increment to a threshold which caused anti-clutter receivers; e.g., M.T.I. receivers, high quantization thresholds and stringent detection criteria to be applied in an attempt to eliminate the clutter return from automatically generating a false target report. If these techniques failed, the cell would be blanked; i.e., no automatic target detection would be allowed in the cell. Thus, contemporary digital video mappers allowed automatic acquisition of moving targets and automatic rejection of stationary targets. Stationary returns could be detected because each memory cell had a one-to-one correspondence with a given area or volume and a stationary target in that cell would always appear in the cell because the video mapper memory was synchronized with the radar's range and azimuth counters so that returns from any given area were always detected in the corresponding memory cells.

SUMMARY OF THE INVENTION

In accordance with the present invention, a digital video mapper is provided that includes a mapper memory that is automatically controlled with respect to a fixed reference rather than to the moving radar. The difficulties involved in using a range-angle, R-$\theta$, addressing technique are avoided in the present system by using an X, Y addressing method wherein the cells are small squares instead of R-$\theta$ segments.

The radar's range and azimuth count is converted by a standard digital differential analyzer (DDA) and rate multiplier to provide a real-time X and Y count that is continuously updated to the correct value by adding or subtracting the X and Y change of the radar platform as detected by its inertial navigation system.

A problem that arises with X–Y cells is that it is difficult to determine when the radar has moved past a cell. With R-$\theta$ cells, the last radar sweep in a cell could be easily determined because all cells at the same azimuth and different range contained the same number of radar sweeps for the same length of time. This is not true for the X–Y cells. Change of status information, ΔS, which represents the detected target data accumulated during a sample interval, such as one quadrant, is stored along with the code of the cell in the memory. During any quadrant, the code bits are used for control to reject stationary clutter. Any changes that occur in detection while the radar is scanning the quadrant are recorded in the ΔS bits. In this way the codes are updated one quadrant late so it is certain that the radar has completely scanned past the cells before they are updated, whereby no detections that occur in a cell are missed.

BRIEF DESCRIPTION OF THE DRAWINGS

FIGS. 3–5 illustrate the organization of the core memory in the apparatus of FIG. 1;

FIG. 6 illustrates the geometry of the radar sweeps relative to the rectangular cells;

Referring now to FIG. 1 of the drawings, there is shown a schematic block diagram of the moving target platform digital video mapper of the present invention. In particular, there is shown a radar system 10 which provides range pulses, R, a direction indication, $\theta$, of the exploratory beam relative to a final direction, quantized video, and an antenna azimuth reference to true north signal. The quantized video is applied to a target detector 12, the antenna azimuth reference to true north signal is applied to a quad counter 13, the direction indication, $\theta$, is applied to a digital differential analyzer 14 and the range pulses, R, are applied to a rate multiplier 16. The digital differential analyzer 14, in response to the $\theta$ input, generates sin $\theta$ and cos $\theta$ outputs which are, in turn, applied to the rate multiplier 16.

Figure 1:
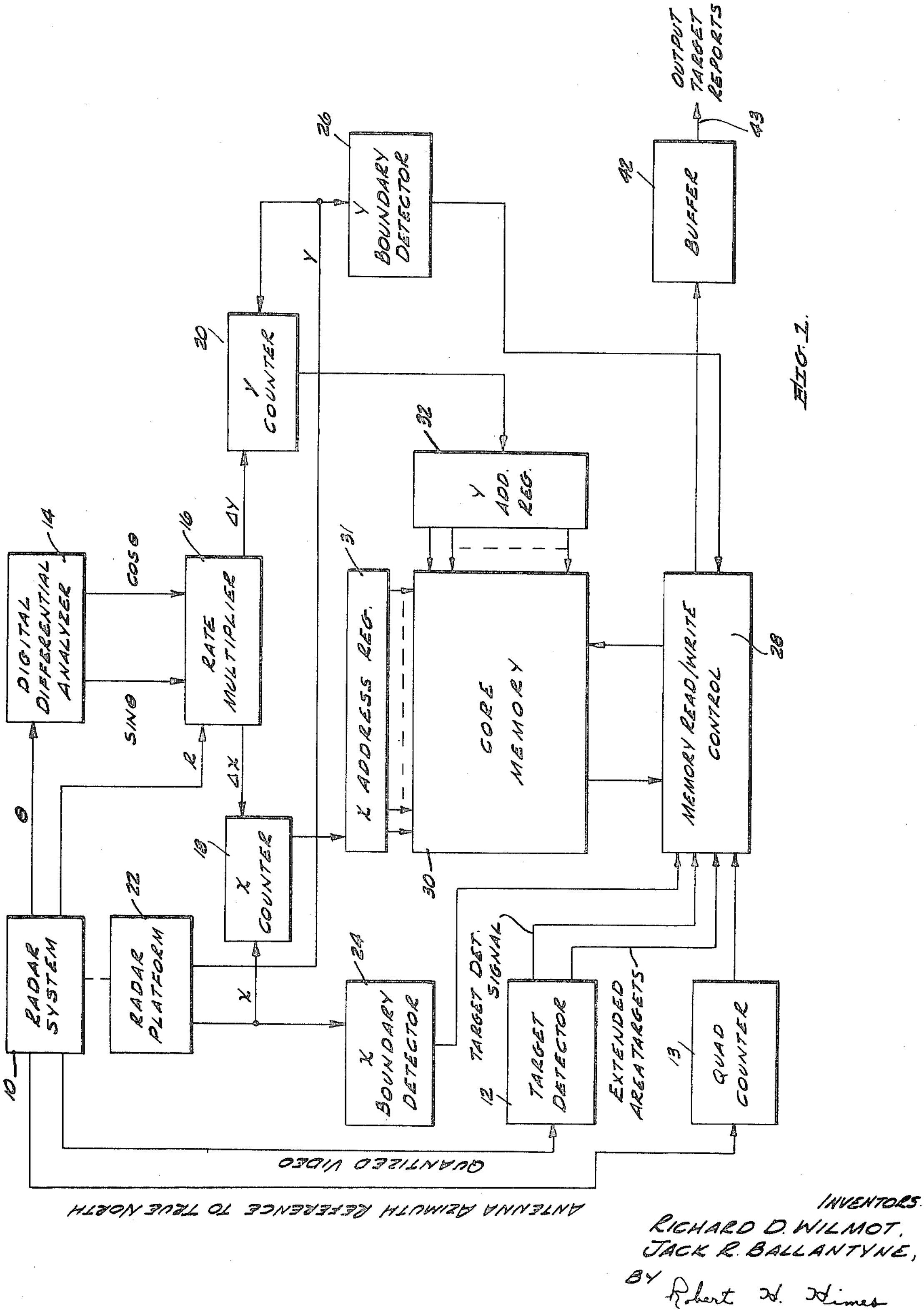
FIG. 1 shows a schematic block diagram of the moving radar platform digital video mapper of the present invention.

The rate multiplier 16, in response to the R, sin $\theta$ and cos $\theta$ inputs, generates X and Y orthogonal increments ΔX and ΔY, respectively. The X increments, ΔX, are applied to an X counter 18 and the Y increments, ΔY, are applied to a Y counter 20. A radar platform 22 including an inertial navigation system detects movement of the radar system 10 relative to the fixed direction which coincides with X and the orthogonal direction, Y. The radar platform 22 generates pulses indicating movement of a predetermined distance in the X and Y direction. The pulses indicating movement in the X direction are applied to the X counter 18 and to an X boundary detector 24. Pulses indicating movement in the Y direction are applied to the Y counter 20 and to a Y boundary detector 26. Outputs from the X and Y boundary detectors 24, 26 are applied to a memory read/write control apparatus 28. In addition, the memory read/write control apparatus 28 receives target detected signals and extended area target signals from the target detector 12 and a quad signal, i.e., a signal defining the quadrant in which the radar system 10 is searching, from quad counter 13.

Further, the memory read/write control apparatus 28 controls a core memory 30 having an X address register 31 and a Y address register 32. The X address register 31 receives inputs from the X counter 18 and the Y address register 32 receives inputs from the Y counter 20. The memory read/write control apparatus 28 provides a detected target output signal to a buffer 42, output target reports therefrom being available on an output lead 43.

Apparatus comprising the memory read/write control apparatus 28 is described in connection with FIG. 2 of the drawings and includes a read register 44 for reading digital information out of core memory 30 and a write register 45 for writing digital information into core memory 30. Write register 45 receives initializing X and Y inputs from the X and Y boundary detectors 24 and 26, respectively. Bit selection logic 46 receives the digital information read out of core memory 30 by read register 44 along with the quad signal from quad counter 13 from which it makes available on separate outputs quad N, quad N–1, quad N–2 and quad N–3 code bit signals, ΔS bits and control bits A and B. The quad N, N–1, N–2 and N–3 bit signals define the present and the prior quadrant in which the radar system 10 has been functioning. The character of the ΔS bits and control bits A and B are hereinafter described.

An update control logic apparatus 47 receives the quad signal from the quad counter 13, and the quad N–1 code bit signal along with the ΔS bits and the control bits A and B from the bit selection logic 46. Outputs from update control 47 are applied to the write register 45 and to a recirculate control apparatus 48 which, in turn, has an output that is applied to the write register 45. Recirculate control apparatus 48 also receives the quad N, quad N–2 and quad N–3 code bits from bit selection logic 46 and an output from a ΔS accumulator control apparatus 50 which, in turn, receives ΔS bits from bit selection logic 46, the quad signal from quad counter 13 and the target detected and extended area target detection signals from radar target detector 12. The output from the ΔS accumulater control 50 is also applied to the write register 45. In addition, the target detected and extended area target detection signals are passed through an "or" gate 52 and applied to an input of a two-input "and" gate 54, the output of an inhibit state decoder 55 responsive to the quad N code bits from bit selection logic 46 is connected through an inverter 56 to the remaining input of the "and" gate 54.

Figure 2:
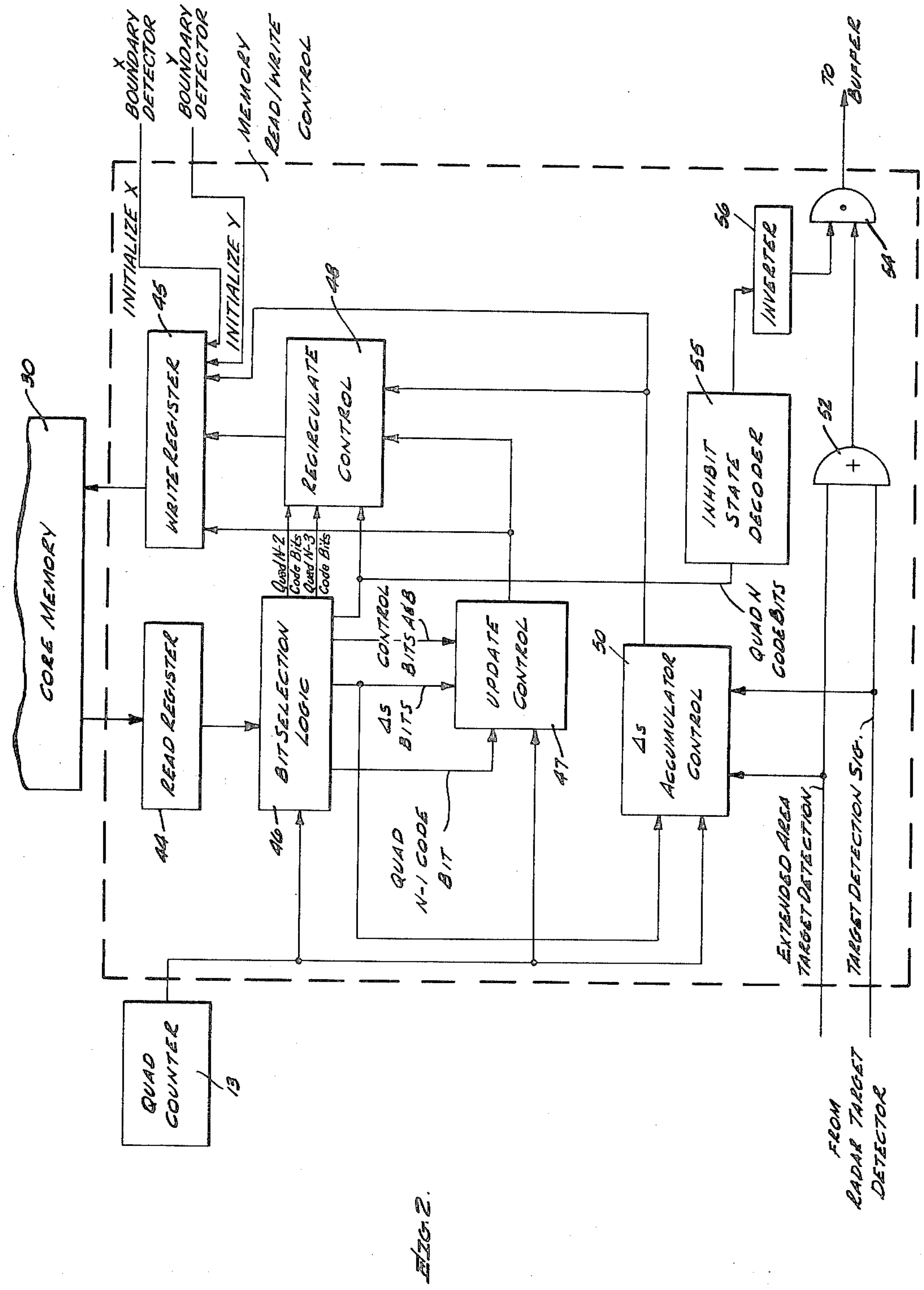
FIG. 2 illustrates the apparatus comprising the memory read/write control in the apparatus of FIG. 1.

The function of the bit selection logic 46 is the same as that described for the segment control shown in FIG. 2 and by the logic equations in columns 7 and 8 in U.S. Pat. 3,325,806, entitled "Video Mapping Device," which patent is assigned to the same assignee as is the present case. This function is to select which bits are to be processed and which bits are to be recirculated.

The bit selection logic 46 contains selection logic for the quad 1, 2, 3, and 4 codes; the quad counter 13 supplies the on time quadrant count which is called quad N. The quad N bits are transferred to the recirculate control 48 so that they can be written back into the core memory 30 by the write register 46 with no change. The quad N code bits are also routed to the inhibit state decoder 55 which decodes the 11 state of the quad N code bits to inhibit in real time target reports in cells containing clutter.

The quad N–2 and N–3 bits are routed to the recirculate control 48 and are written back into the core memory 30 without being changed. The ΔS and A and B control bits are always routed directly to the update control 47.

The quad N–1 bits are routed to the update control 47 because the modification of the quad bits is always done one quadrant late to ensure that all of the target reports for all of the cells have been processed before updating the code bits.

The implementation of the bit selection logic 46 is straightforward and substantially the same as that described in U.S. Pat. No. 3,325,806, column 7. The quad counter 13 has four states which correspond to the four quadrants shown in FIG. 5. The bit selection logic uses the quad counter 13 state, which is quad N, to gate the corresponding quad N code bits to recirculate control 48 and inhibit state decoder 55. The quad N–1 count is generated by subtracting one from the quad N count and this signal is used to gate the N–1 code bits to the recirculate control 48. For example, when the quad counter 13 is in state 3, the quad N bits numbers 5 and 6 are gated through to the inhibit state decoder 55 and the recirculate control 48. The quad N–1 bits are bit numbers 3 and 4, and they are gated through to the update control 47. The quad N–2 bits are bit numbers 1 and 2; the quad N–3 bits are bit numbers 7 and 8. These bits are gated through to the recirculate control 48. The bit selection logic 46 thus consists of a series of "and" gates which are controlled by the quad counter 13 states to gate the code bits through to the appropriate units.

The update control 47 receives the ΔS, A and B control, and quad N–1 code bits along the quad N counter 13 state. The update control 47 decodes the quad N counter state and the control bits A and B states to determine the time to update the quad N–1 code bits; this is the first time the cells are accessed during the quad N count. The states of the ΔS bits are decoded and are used to increment, decrement, or leave unchanged the quad N–1 code bits. At the same time the ΔS bits are used to update the quad N–1 code bits, the ΔS bits are reset to zero so that they can now be used to accumulate the history of detections during quad N.

The recirculate control 48 recirculates the code bits for quad N, N–2 and N–3 with no change. The control bits A and B, the ΔS bits, and the quad N–1 code bits are received from the update control 47 and recirculated with no change except when the update time occurs; at this time the update control overrides the recirculate control and writes the new data directly into the write register 45.

Figure 9:
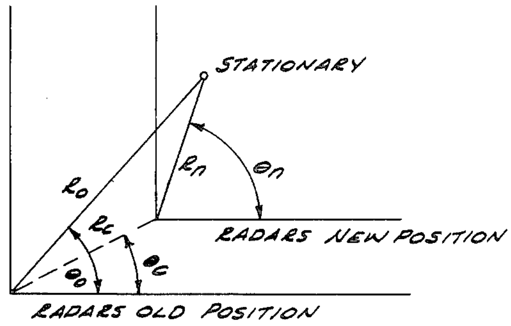
FIGS. 9 and 10 illustrate the problem resulting from movement of the radar platform in polar and rectangular coordinates, respectively.

The apparatus of the present invention automatically corrects the addressing of the core memory 30 so that a stationary target will always appear in the same cell. Theoretically, this could be done by continuously adjusting the range and azimuth counter registers (not shown) to compensate for the motion of the radar platform 22 from scan to scan. This technique, however, is quite difficult to implement as shown in FIG. 9. When R, $\theta$ coordinates are used, the change in position of the radar platform 22 affects both the range and the azimuth of the new measurement. This occurs because the R and $\theta$ parameters are not independent; a change in the range to a target caused by movement of the radar platform 22 will, in general cause a change in both R and $\theta$ of the new target measurement. To correct the addressing of a digital mapper memory would require adding control logic that would reference the original measured range and azimuth ($R_o$ and $\theta_o$) of the target to the new measured target data ($R_N$, $\theta_N$) and the change in position of the radar platform ($R_C$, $\theta_C$). Equations for $R_o$, $\theta_o$ are as follows:

$$R_o=[(R_C\cos\theta_C+R_N\cos\theta_N^2+(R_C\sin\theta_C+R_N\sin\theta_N)^2]^{1/2} \quad (1)$$

$$\theta_o=\cos^{-1}\left[\frac{R_C\cos\theta_C+R_N\cos\theta_N}{R_o}\right] \quad (2)$$

Equations 1 and 2 show that both $R_o$ and $\theta_o$ are functions of $R_N$, $R_C$, $\theta_N$ and $\theta_C$; the equations to convert these variables back to $R_o$ and $\theta_o$ are complex and would be difficult to perform in a real-time memory address control unit.

Figure 10:
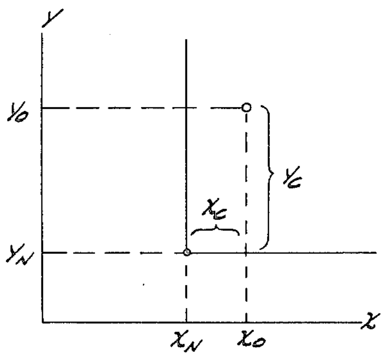

The difficulties involved with using an R, $\theta$ memory addressing technique can be avoided by using an X, Y addressing method, as shown in FIG. 10, wherein the cells are small squares instead of R, $\theta$ segments. Because X and Y are orthogonal, they are independent and the memory address correction logic can be implemented for X and Y correction as follows:

$$X_o = X_C + X_N \quad (3)$$

$$Y_o = Y_C + Y_N \quad (4)$$

wherein:

$X_o$=Original X of target
$Y_o$=Original Y of target
$X_N$=New X of target
$Y_N$=New Y of target
$X_C$=Change in X of radar between scans
$Y_C$=Change in Y of radar between scans FIG. 10 shows the implementation for Equations 3 and 4 wherein scalar addition is now used in place of vector addition. This means that to reference the new position $X_N$, $Y_N$ to the old position $X_o$, $Y_o$ it is only necessary to add the change in position $X_C$, $Y_C$ of the radar platform 22 since the last scan. In contrast, it requires four multiplications, two sums, squaring two terms, adding two terms, and taking their square root (Equation (1)) to reference the new range to the old range; another complicated calculation (Equation (2)) would be required to reference the new azimuth, $\theta_N$, to the old azimuth, $\theta_o$. It is therefore apparent that it is impractical to adjust R, $\theta$ address registers to compensate for motion of radar platform 22. In the case of the X, Y address registers 31, 32, on the other hand, it is comparatively easy to compensate for motion of radar platform 22 as only one simple operation (adding) is required; this operation can be accomplished in real time. The X, Y cells are uniform in size and do not vary in area with range, as is the case with R, $\theta$ cells.

In the case of the apparatus of FIG. 1, the X, Y counters 18, 20 are corrected for motion of radar platform 22 and are then used to control the address of core memory 30 through X, Y address registers 31, 32. The automatic rejection of stationary targets is accomplished in the usual manner as using X–Y cells in place of R–$\theta$ cells has no effect on the clutter rejection logic. The range and azimuth count of radar system 10 is converted by digital differential analyzer 14 and rate multiplier 16 to provide a real-time X and Y count that is continuously updated to the correct value by adding or subtracting the X and Y change, ΔX and ΔY, of the radar platform 22 as detected by an inertial navigation system (not shown).

A problem that arises with X, Y cells is that it is difficult to determine when the radar sweep has moved past a cell. With R, $\theta$ cells, the last radar sweep in the cell could be easily determined because all cells at the same azimuth and different range contained the same number of radar sweeps for the same length of time. Referring to FIG. 6, there are shown radar sweeps 60 passing over X–Y cells 62. Thus it is apparent that it is not a simple matter to determine when the last radar sweep crosses a particular X–Y cell 62. In view of this, a cell sampling interval equal to an entire quadrant of X–Y cells (FIG. 6) is employed in the apparatus of FIG. 1. Change of status information, ΔS, which represents detected target data from target detector 12 is accumulated during this sample interval and is stored along with the code of the respective cells in ΔS accumulator control 50, FIG. 2.

Referring now to FIGS. 3, 4, and 5, there is shown the memory organization for a radar range of 256 miles with 4 mile square cells. Each cell requires 2 bits for codes; 2 bits are needed for storing the detection history during the sample scan (ΔS bits). In addition, 2 control bits, update A and B, are used for update control. Under these circumstances, the core memory 30 requires 4,096 words of 12 bits each with all 4,096 words being accessed for each quadrant. The first 2 bits are used to indicate the state of the cells in quadrant 1, FIG. 5, the second 2 bits are used for quadrant 2 cells, the third 2 bits for quadrant 3 cells, and the fourth 2 bits for quadrant 4 cells. However, only one set of ΔS bits and control bits are needed for all quadrants.

The following codes and procedures may be used in the apparatus described in FIGS. 1 and 2:

QUAD CODE

00 No detections in cell.
01 Detection on 1 out of 3 sample scans.
10 Detections on 2 out of 3 sample scans.
11 Detections on 3 out of 3 sample scans; Inhibit outputs for this cell.

ΔS CODE

00 No detections during the sample scan.
01 1 or more normal size detections during the sample scan.
11 1 or more extended area detections during the sample scan.

UPDATE A BIT

Is set true during Quad II when Quad I codes are updated and is erased during Quad III; is set true during Quad IV when Quad III codes are updated and is erased during Quad I.

UPDATE B BIT

It set true during Quad I when Quad IV codes are updated and is erased during Quad II; is set true during Quad III when Quad II codes are updated and is erased during Quad IV.

The memory update control logic can be explained by referring to the memory word format (FIG. 3) and the memory 30 read/write control logic (FIG. 2). During each sample scan, which is typically every fourth scan of the radar to allow moving targets to fly through a cell, the ΔS bits are used to record whether there were no detections, normal size target detections, or extended area target detections and the ΔS bits are set to 00, 01, or 11 for each word of the quadrant. The code bits for the quadrant, FIG. 5, are updated one quadrant late after it is certain that the total detection history for the quadrant has been recorded in the ΔS bits.

The control bits A and B, FIGS. 3 and 4, are used to indicate that the code update process has been completed; an example will illustrate the operation. During quadrant I, the quadrant I code bits (bits 1 and 2) are read out by read register 44 into bit selection logic 46 and used for real time control; i.e., all cells with an 11 code cause the output of the radar target detector 12 to be inhibited by the inhibit state decoder 55. Also during quadrant I, the ΔS bits accumulate the detection history for all cells in quadrant I. When quadrant II is reached, the first time each word is accessed from memory 30 during quadrant II, the ΔS bits accumulated in ΔS accumulator control apparatus 50 (which represent the detection history of quadrant I) are used to update the quadrant I code bits as follows: decrement the code by 1 for ΔS=00; increment the code by 1 for ΔS=01; increment the code by 2 for ΔS=11. (A faster increment is used for extended area targets because of the higher probability that they represent clutter.) After being read out and used to update the quadrant I codes, the ΔS bits in ΔS accumulator control 50 are reset and are then used to store detection history during quadrant II. The control bit A is set to indictae that the quadrant I codes have been updated and control bit B is reset so that it can be used in the next quadrant. The other quadrant code bits are recirculated through bit selection logic 46 and recirculate control 48 to write register 45 without change until the proper time to update them occurs. The sequence continues with code bits for quadrant II being updated during quadrant III, quadrant III bits being updated during quadrant IV, and quadrant IV bits being updated during quadrant I. Bit A is written during the update cycle in quadrant II and erased during quadrant III, written during the update cycle in quadrant IV and erased during quadrant I. Bit B is out of phase with Bit A and is written during quadrants I and III and erased during quadrants II and IV. The use of bits A and B together with the real time quad counter 13 indicate when the N–1 code bits have been updated and thus prevent erroneous, multiple updating.

The quadrant counter 13 receives inputs from the rotating antenna of radar system 10 which are referenced to antenna revolutions with respect to true north; no angular compensation is needed since the only purpose of the quadrant counter is to indicate the rotation of the antenna for memory read-write control. Thus the reference for the quadrant counter 13 is true north and the counter 13 is incremented by the antenna rotation and is not affected by changes in the heading of the radar platform 22.

During any quadrant, the quad N code bits available from bit selection logic 46 are applied through inhibit state decoder 55 and inverter 56 to "and" gate 54 to reject stationary clutter.

Figure 8:
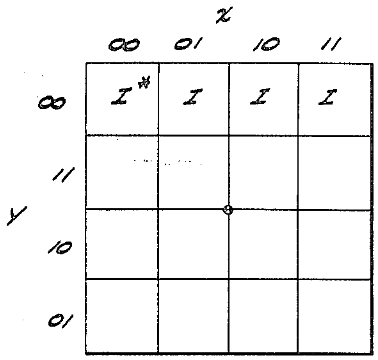
FIGS. 7 and 8 illustrate the addition and dropping of a row of cells due to movement of the radar platform.

Another problem associated with digital clutter mapping for the radar system 10 with the moving radar platform 22 is caused by the motion of the radar platform 22 causing some cells to be left with obsolete data from radar returns beyond the range of the radar in its new position. As the radar system 10 moves in a given direction, for example in the +Y direction as in FIG. 7, the first row of cells in Y are left behind as the radar range no longer encompasses them. At the same time, a new row of cells is required to process the data from new returns just being detected as the radar platform 22 moves into their range. To accommodate the new returns and to discard the old, the cells that are left behind must be transferred to process the new data. This is accomplished by sensing by means of the X and Y boundary detectors 24, 26, FIG. 1, when the radar range has moved past the boundary of the oldest row of cells and then transferring this row of cells to the opposite end of the range by changing the address of the cell as illustrated in FIG. 8. This is achieved by adding or subtracting the change in X and Y of the radar platform 22 to the X and Y address registers 31, 32, respectively.

Figure 7:
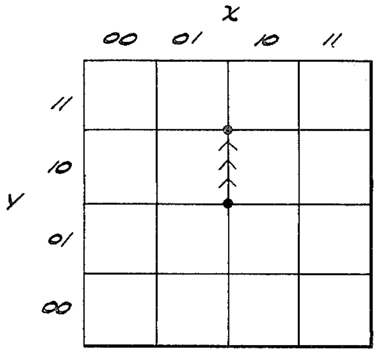

The X boundary detector 24 and the Y boundary detector 26 detect when the radar range has moved past the boundary of the last group of cells in X or Y. When this occurs, the last group of cells are transferred to the first group of cells as shown in FIGS. 7 and 8 where the bottom row of cells are transferred to the top. This is accomplished by adding or subtracting the change in X or Y to the X or Y address registers 31, 32, respectively. When the cells are transferred by changing the address registers, it is necessary to change the contents of the cells, because the data in the cells is no longer meaningful. This is accomplished by setting the bits to zero for the cells that are transferred. This is shown in FIG. 2 where the X boundary detector 24 and the Y boundary detector 26 are used as inputs to write register 46 to set the bits to zero for the cells that are being transferred.

When a boundary is detected, it is also necessary to initialize the code in certain cells, i.e., the codes representing the old data are erased and the code representing the initial state is written into memory. By way of example, when the platform 22 is moving in the +Y direction, those cells which lie along the −Y extremity of the cell matrix must be initialized. As the platform 22 moves with a velocity having a positive Y component, the Y counter 20 is continually adjusted to compensate for the Y motion of the platform 22. When a boundary is crossed, the bottom row of cells, FIG. 7, are automatically moved to the top of the array. The contents of those cells are initialized at this time, as shown in FIG. 8. In the case of movement in the X direction, the X counter 18 is continually adjusted to compensate for the X motion of the platform 22. Operation is similar to that for the Y direction.

The invention as described is by way of illustration and not limitation and may be modified in various particulars within the scope of the appended claims.

What is claimed is:

1. In a digital video mapper apparatus for mapping target indications from a radar system mounted on a moving platform, said apparatus comprising means responsive to the radar sweep, range and azimuth information from said radar system for generating a first series of electrical impulses indicative of changes in range and azimuth of said radar sweep along first and second linear orthogonal coordinates;

means coupled to said radar system for generating a second series of electrical impulses indicative of movement of said radar system along said first and second linear orthogonal coordinates;

a memory having a plurality of cells corresponding to rows and columns of identifiable areas in the plane of said orthogonal coordinates;

means responsive to antenna azimuth reference to true north information from said radar system for accumulating target indications from said radar system for one quadrant of said orthogonal coordinates; and means responsive to said first and second series of electrical pulses for transferring said accumulated target indications to corresponding cells of said memory after each successive quadrant has been covered.

2. The digital video mapper apparatus for mapping target indications from a radar system mounted on a moving platform as defined in claim 1 wherein said memory has additional capacity constituting first and second bits corresponding to each of said plurality of cells corresponding to rows and columns of identifiable areas for one quadrant of said orthogonal coordinates for recording that the transfer of said accumulated target indication to corresponding cells of said memory has occurred.

3. A video mapping device for operation in conjunction with a surveillance radar transmitter-receive apparatus on a moving platform, said radar apparatus having range count and azimuth position signals and being capable of generating an antenna azimuth reference to true north signal and a quantized video signal, said video mapping device comprising a memory having a predetermined number of groups of cells, each cell having first and second bits for each of a plurality of rectangular segments included in first, second, third and fourth quadrants constituting the surveillance area of said radar apparatus; means responsive to the radar sweep, range and azimuth information from said radar system for generating a first series of electrical impulses indicative of changes in range and azimuth of said radar sweep along first and second linear orthogonal coordinates for addressing said memory; means responsive to said antenna azimuth reference to true north signal for accumulating target indications from said radar system for successive quadrants of said orthogonal coordinates; and means for transferring said accumulated target indications to corresponding cells of said memory after each successive quadrant has been covered by said radar system.

4. The video mapping device for operation in conjunction with a surveillance radar transmitter-receiver apparatus on a moving platform as defined in claim 3 additionally including means for setting said first and second bits in each cell of said memory to a first binary number to indicate no detections in said cell, to a second binary number to indicate detection in said cell on one out of three sample scans of said radar, to a third binary number to indicate detections in said cell on two out of three scans of said radar, and to a fourth binary number to indicate detections in said cell on three out of three sample scans of said radar.

5. The video mapping device for operation in conjunction with a surveillance radar transmitter-receiver apparatus on a moving platform as defined in claim 4 wherein said memory has additional capacity constituting first and second update bits corresponding to each cell of said first, second, third or fourth quadrants; means for setting said first update bit true during quadrant two when corresponding quadrant one codes are updated and for erasing said first update bit during quadrant three; means for setting said first update bit true during quadrant four when corresponding quadrant three codes are updated and for erasing said first update bit during quadrant one; means for setting said second update bit true during quadrant one when corresponding quadrant four codes are updated and for erasing said second update bit during quadrant two; and means for setting said second update bit true during quadrant three when corresponding quadrant two codes are updated and for erasing said second update bits during quadrant four.

6. A video mapping device for operation in conjunction with a surveillance radar transmitter-receiver apparatus on a moving platform, said radar apparatus having range count and azimuth position signals and being capable of generating an antenna azimuth reference to true north signal and a quantized video signal, said video mapping device comprising a memory having a predetermined number of cells corresponding to rows and columns of rectangular segments constituting the surveillance area of said radar system; means for detecting movement of said platform in a first direction parallel to one side of said rectangular segments in increments equal to the dimension thereacross orthogonal to said one side of said respective segments; means for detecting movement of said platform in a second direction orthogonal to said one side of said rectangular segments in incrents equal to the dimension across said respective segments along said one side thereof; write register means including a first boundary detector responsive to said detections in said first direction for readdressing to the initial row the cells in said memory corresponding to the trailing row of rectangular segments normal to said first direction and including a second boundary detector responsive to said detections in said second direction for readdressing the cells in said memory corresponding to the trailing column of rectangular segments normal to said second direction to the initial column whereby said cells continue to correspond to rows and columns of rectangular segments which constitute the surveillance area of said radar system.

References Cited

UNITED STATES PATENTS

| | | | |
|---|---|---|---|
| 3,281,839 | 10/1966 | Triest et al. | 343—5 DP X |
| 3,325,806 | 6/1967 | Wilmont et al. | 343—5 D P |

T. H. TUBBESING, Primary Examiner

U.S. Cl. X.R.

343—5 DP